(12) United States Patent
Montaron

(10) Patent No.: US 7,532,983 B2
(45) Date of Patent: May 12, 2009

(54) METHOD AND APPARATUS FOR MEASURING THE WETTABILITY OF GEOLOGICAL FORMATIONS

(75) Inventor: Bernard Montaron, Clamart Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 227 days.

(21) Appl. No.: 11/382,514

(22) Filed: May 10, 2006

(65) Prior Publication Data

US 2007/0112518 A1     May 17, 2007

(51) Int. Cl.
*G01V 1/40*     (2006.01)
(52) U.S. Cl. .............................. 702/7; 702/11
(58) Field of Classification Search .............. 702/6, 702/7, 8, 11, 12, 13
See application file for complete search history.

(56) References Cited

U.S. PATENT DOCUMENTS 6,765,380 B2 * 7/2004 Freedman et al. ........... 324/303

2004/0000905 A1   1/2004 Freedman et al.

OTHER PUBLICATIONS

Anderson, William G., "Wettability Literature Survey—Part 2: Wettability Measurement," Journal of Petroleum Technology, Nov. 1986, pp. 1246-1262.
Zhou, Engen et al., "A Percolation Study of Wettability Effect on the Electrical Properties of Reservoir Rocks," Transport in Porous Media, Reidel, Dordrecht, NI., pp. 85-98, XP002330071.

* cited by examiner

*Primary Examiner*—Manuel L Barbee
(74) *Attorney, Agent, or Firm*—Darla P. Fonseca; Jamie Castano; Dale Gaudier

(57) ABSTRACT

The invention discloses a method for determining the wettability of an underground formation traversed by a borehole, the method comprising: determining the critical water fraction of the underground formation; determining the critical water fraction of the underground formation taken entirely oil-wet, which is called the oil-wet critical water fraction; and combining the critical water fraction and the oil-wet critical water fraction in order to determine the wettability of the underground formation.

26 Claims, 5 Drawing Sheets

---

41 Determination of the critical water fraction

42 Determination of the oil-wet ~~maximum~~ critical water fraction

43 Determination of the wettability from the critical water fraction and the ~~maximum~~ oil-wet critical water fraction

METHOD AND APPARATUS FOR MEASURING THE WETTABILITY OF GEOLOGICAL FORMATIONS

FIELD OF THE INVENTION

The present invention broadly relates to characterization of geological formation. More particularly the invention relates to an apparatus and related method for measuring the oil wettability of porous geological rocks.

DESCRIPTION OF THE PRIOR ART

The characterization of petrophysical properties of underground formations using electrical wireline logging technology has played a key role in the rapid development of the oil and gas industry in the last decades. Traditionally, resistivity measurements are at the origin of the logging services for the oil and gas exploration, made more than 75 years ago by industry pioneers—the Schlumberger brothers, Marcel and Conrad. The formation resistively measurements were also called "electrical coring" because they allowed acquiring continuously information versus depth in an oil or gas well, information previously obtained only be mechanical coring. The porous rocks contain fluids which can be brine, oil or gas. The solid part of the rock does not generally conducts electricity (except shales, and some minerals such as Pyrite), oil and gas don't either and the main material which conducts electricity in underground formations is brine, i.e. water. This strong correlation between formation resistivity (or conductivity) and the water content was initially used as a qualitative fluid content indicator. For example in geological sequences of layers of shales and sandstones, the signature of a hydrocarbon reservoir is a resistivity sequence (from top to bottom) Low-High-Very Low corresponding to a shale cap on top of a sandstone reservoir contained mostly oil and/or gas in the top part and brine in the lower part.

The introduction of Archie's law allows calculating the water saturation $S_w$ (the volume fraction of the porous space occupied by water) of porous rock as a function of the measured resistivity $R_t$. This equation allowed to move from qualitative to quantitative determination of hydrocarbon reserves. Archie's law takes the form of:

$$R_t = \frac{R_w}{S_w^n \phi^m} \qquad \text{(Equation 1)}$$

In water-wet formations, that is porous formation in which the inner surface of the pores is entirely (or almost) covered by a film of water regardless of the amount of oil or gas present in the porosity, Archie's law was found to apply simply with both exponents n and m close to 2, and in fact in many cases one can use n=m=2 as a very good approximation for water-wet formations:

$$R_t = \frac{R_w}{(S_w \phi)^2} \qquad \text{(Equation 2)}$$

Most sandstone formations are water-wet and equation (2) has been used to estimate hydrocarbon reserves in sandstone reservoirs directly from resistivity and porosity measurements. For example the volume fraction of hydrocarbons will be equal to $(1-S_w)\phi$ which is directly calculated from $S_w=1/\phi \sqrt{R_w/R_t}$ using a value porosity measured independently.

Other formations, such as carbonates, are known to be oil-wet or partially oil-wet ("mixed-wet") and for these, equation (2) does not apply and equation (1) is generally used instead. One has to determine the value of exponents n and m before a quantitative determination of saturation can be done from resistivity. The method generally used to determine the exponents is called "special core analysis", or SCAL, and consists in artificially changing a core saturation $S_w$ to a series of known values and measuring the corresponding resistivities $R_t$. The exponents m can be obtained simply by comparing the resistivity R0 of a totally brine saturated core to its porosity: $m=\ln(R_w/R_0)\ln\phi$.

The exponent n is obtained by calculating the best fit value of the slope of a straight line in a log-log plot of $R_t$ versus $S_w$ using the least square method. Nevertheless, this method stuffers some major drawbacks. First, one cannot use a fixed formula to calculate saturations from resistivities and porosities to estimate reserves of a new field. Doing this requires a costly and time consuming coring campaign and core analysis study. Second, cores are small rock samples which may not be representative of the formation properties over long intervals especially when dealing with heterogeneous formation which is often the case of carbonates. It is hard to economically justify entirely coring all the wells in a field: on the other hand the equivalent wireline logging information is generally available. Third, it is not obvious that the experiments conducted in the lab to change saturation in cores lead to results which are really representative of virgin downhole formations. There are many issues with the representativeness of SCAL results. Diffusion of fluid molecules in downhole porous rocks is a very slow process that is dominant at the time scale of geological times (millions of years) and it is not possible to match this in the lab in tests which generally last just a few days or a few weeks at best. This time scale argument is particularly important regarding the distribution of the wettability throughout the porosity of the formation. This distribution and its correlation to the distribution of pore sizes, and the capillary continuity of the films of water and oil are known to have a major effect on the value of the n exponent.

The consequence of the above limitation is that the saturations in carbonates and more generally oil-wet or mixed-wet formations derived from resistivity measurements and Archie's law are generally not considered fully trustable.

Archie's law (1) does not teach anything about how the exponents n and m depend on wettability and other properties of the formations. Nevertheless there is clear experimental evidence showing that wettability must appear in the model of Archie's law. For example, rocks with same porosity, same water saturation, and same water resistivity can have dramatically different value of resistivity (ratios in excess of 1000 are possible). Therefore a correct petrophysical model for the resistivity (or the conductivity) of porous formations must include wettability as a variable.

Furthermore, knowledge of the wettability of an oil reservoir is important to reservoir and production engineers because reservoir wettability influences reservoir properties such as residual oil saturation, relative permeability, and capillary pressure. See F. G. Craig in the Society of Professional Engineers (SPE) Monograph on "*The Reservoir Engineering Aspects of Waterflooding*", 1971. Thus, reservoir wettability information is critical for a meaningful modeling and simulation of the reservoir in order to obtain an efficient oil recovery.

Currently, wettability is generally measured not directly in the well but in a laboratory from cores brought to the surface. Some drawbacks appear from this method, first as already said a coring campaign and core analysis study are costly and time consuming, secondly cores are small rock samples which many not be representative of the formation properties. And finally, extracted information may also not be representative due to the fact that cores cannot be preserved exactly to downhole conditions of pressure and temperature from downhole extraction to laboratory analysis. A lot of prior arts describe two widely-used wettability indicators, which are the contact angles in water-oil-solid systems and the Amott wettability index. The associated apparatus and method are described in patents U.S. Pat. Nos. 4,506,542; 6,185,985; 5,463,894; 5,698,772; 6,229,312 and 5,679,885. Other prior arts define measurement of wettability which can be done by means of low-field nuclear magnetic resonance (NMR) as in patent WO 2004/025317. In addition, other laboratory test for wettability are also available, including imbibition measurements. However, all these tests are laboratory measurements and are not performed downhole.

Such laboratory measurements could be made downhole using specially developed tools but would require the tool to remain stationed in front of the formation during a sufficient time for the measurement to be completed. By definition this type of tool and measurement could never be made continuous versus depth, but instead would give data at discrete depth positions in the well. When measurements of wettability are done directly downhole in the well it is highly desirable to have continuous measurement versus depth (i.e. logging) in order to be able to characterize the heterogeneity of the formations with respect to the distribution of the wettability, and to make these measurements sufficiently fast for the logging operation to be economical. Continuous logging of wettability in downhole conditions require that the new techniques must be found, as for example nuclear magnetic resonance approach. In contrast, NMR approach only provides a qualitative wettability indicator but has the advantage of being able to assess the fluids and rock at reservoir conditions. Patent U.S. Pat. No. 6,765,380 discloses such method to determine reservoir under downhole conditions.

Therefore as seen, there are currently no quantitative in-situ measurements of wettability available in oil and gas industry, despite its considerable importance.

The purpose of the invention is to provide a method and related apparatus to measure directly the wettability in oil and gas wells by applying a new petrophysical model replacing Archie's law and using an appropriate measurement method for the various parameters of the model.

SUMMARY OF THE INVENTION

The invention provides a method for determining the wettability of an underground formation traversed by a borehole, the method comprising: determining the critical water fraction of the underground formation; determining the critical water fraction of the underground formation taken entirely oil-wet, which is called the oil-wet critical water fraction; and combining the critical water fraction and the oil-wet critical water fraction in order to determine the wettability of the underground formation.

In a preferred embodiment, the step of determining the critical water fraction comprises the step of determining a set of properties of the underground formation, the properties being chosen among a list comprising: formation resistivity, water resistivity, formation water saturation, and formation porosity: determining the critical exponent of the electrical conductivity of the formation; and calculating from the set of properties and the critical exponent the critical water fraction. Preferably, the formation porosity, the formation resistivity and the formation water saturation are measured using one or several downhole tools lowered in the borehole, the downhole tools measuring the same volume of formation and therefore the same rock formation. The water resistivity can also be measured or is estimated from known characteristics of the mud filtrate or of the formation brine.

The critical exponent is substantially equal to 2. Nevertheless, the value of the critical exponent can be estimated or predetermined. The correlation can be established once and for all and stored in a "catalog" of rock types giving a relation table linking each type of rock or formation to a value of the critical exponent. In a preferred embodiment, the method further determines the rock type from lithologic measurements and uses the relation table for critical exponent.

The oil-wet critical water fraction is generally substantially equal to 0.15. Nevertheless, the value of the oil-wet critical water fraction can be estimated or predetermined. The correlation can be established once and for all and stored in a "catalog" of rock types giving a relation table linking each type of the rock to a value of the oil-wet critical water fraction. In a preferred embodiment, the method further determines the rock type from lithologic measurements and uses the relation table for oil-wet critical water fraction. The oil-wet critical water fraction can be determined using special core analysis techniques for each rock type using core examples. This requires the core to be made entirely oil-wet and then determining the oil-wet critical water fraction from the resistivity versus saturation curve.

In a preferred embodiment, the wettability of the underground formation is equal to the critical water fraction divided by the oil-wet critical water fraction.

In another aspect, the invention provides a method for determining the wettability of an underground formation traversed by a borehole, the method of compromising: determining the ratio "n/m" of Archie's law exponents (n/m), the porosity and the water saturation of the underground formation; determining the critical water fraction of the underground formation taken entirely oil-wet, which is called the oil-wet critical water fraction; and combining the ratio (n/m), the oil-wet critical water fraction, the porosity and the water saturation in order to determine the wettability of the underground formation. Preferably, the ratio (n/m), the porosity, and the water saturation are measured using one or several downhole tools lowered in the borehole, the downhole tools measuring the same volume of formation and therefore the same rock formation.

In another aspect, the invention provides a method for determining a map of the wettability of a geological formation traversed by a borehole, the method comprising: determining the wettability value for different depths of the borehole according to the method as claimed in any preceding claim: and computing said wettability values to determine a map of the wettability of the geological formation. The advantages of the wettability determination are the direct or in-situ determination from measurements with one or several downhole tools and the continue determination because measurements are taken continuously and rapidly versus depth. The map can be a one dimension map if measurements are taken along the depth of the borehole. The map can be a two dimensions map if measurements are taken along the depth of two different boreholes and measurements are computed to obtain a 2D map. Or even, the map can be a three dimensions map if measurements are taken along the depth of various boreholes drilling in an oilfield and measurements are computed to obtain a 3D map.

In another aspect, the invention provides an apparatus for performing downhole measurement of the wettability of an underground formation traversed by a borehole, the apparatus having a longitudinal axis and being lowered in the borehole along the longitudinal axis, the apparatus comprising: a first sensor for measuring the water saturation of the underground formation; a second sensor for measuring the resistivity of the underground formation; and first and second sensors being located substantially at the same position along the longitudinal axis of the apparatus, and first and second sensors measuring a same location of the underground formation; and the apparatus; determines the critical water fraction of the underground formation from the water saturation and the resistivity; determines the oil-wet critical water fraction of the underground formation; and deduces the wettability of the underground formation from the critical water fraction and oil-wet critical water fraction.

Preferably, the same location is located at a radial distance from the longitudinal axis of the apparatus and is defined by an angular sector from the longitudinal axis of the apparatus. Preferably also, the same location is defined by a torus surrounding the borehole and having a symmetry axis identical to the longitudinal axis of the apparatus when the apparatus is spinning around the longitudinal axis.

BRIEF DESCRIPTION OF THE DRAWINGS

Further embodiments of the present invention can be understood with the appended drawings.

DETAILED DESCRIPTION

Figure 1:
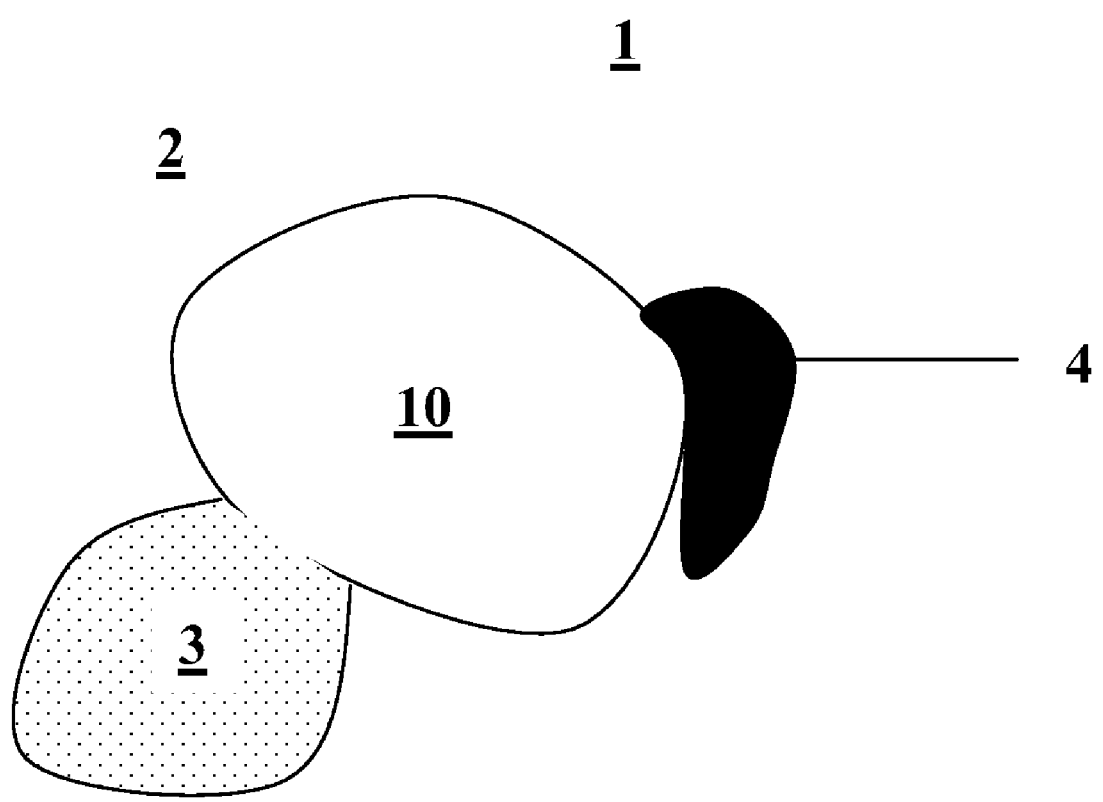
FIG. 1 shows a representation of the environment of a grain a pure formation.

First of all, it is of prime importance to define the term "wettability". Referring to FIG. 1, any point of the inner surface of the pore of a porous formation 10 can be in direct contact with water 1, oil 2, gas 3 or hydrocarbon in solid form 4 such as bitumen and asphaltenes. The fraction of the total porous medium surface covered with water (water-wet) is called the structural water-wetting index $J_w$. The fraction of the surface covered with oil is $Y_O$, the fraction covered with tar or asphaltenes is $Y_T$ and the remaining surface fraction is $Y_G$ and one has $J_W + Y_O + Y_T + Y_G = 1$. A pore can have its surface partially covered by water and partially by oil, but we expect also to find pores entirely water-wet or entirely oil-wet. It is simpler to consider the water-wetting index $J_w$ and the remaining fraction $1-J_W$. In the rest of the document, we will define $1-J_W$ to be the "oil-wetting index" $J_o$ to be understood as the hydrocarbon-wetting index with $J_w + J_o = 1$.

With the above definitions, it can be seen that $J_w$ (respectively $J_w$) is also the probability for any point of the surface taken at random to be water-wet (respectively oil-wet). Also, $J_w$ or $J_o$ is a quantitative characterization of the wettability of a porous formation. A virgin downhole porous formation has a given distribution of the wettability with a characteristics value of $J_o$.

Assuming one could observe, as said before, at a suitable scale, zones of the rock which are entirely water-wet, and zones which are entirely oil-wet, then one could define a volume fraction x for oil-wet rock and 1−x for water-wet rock. The scale to be considered could be the pore scale (10-100 microns) or even larger (millimeters or centimeters).

Figure 2:
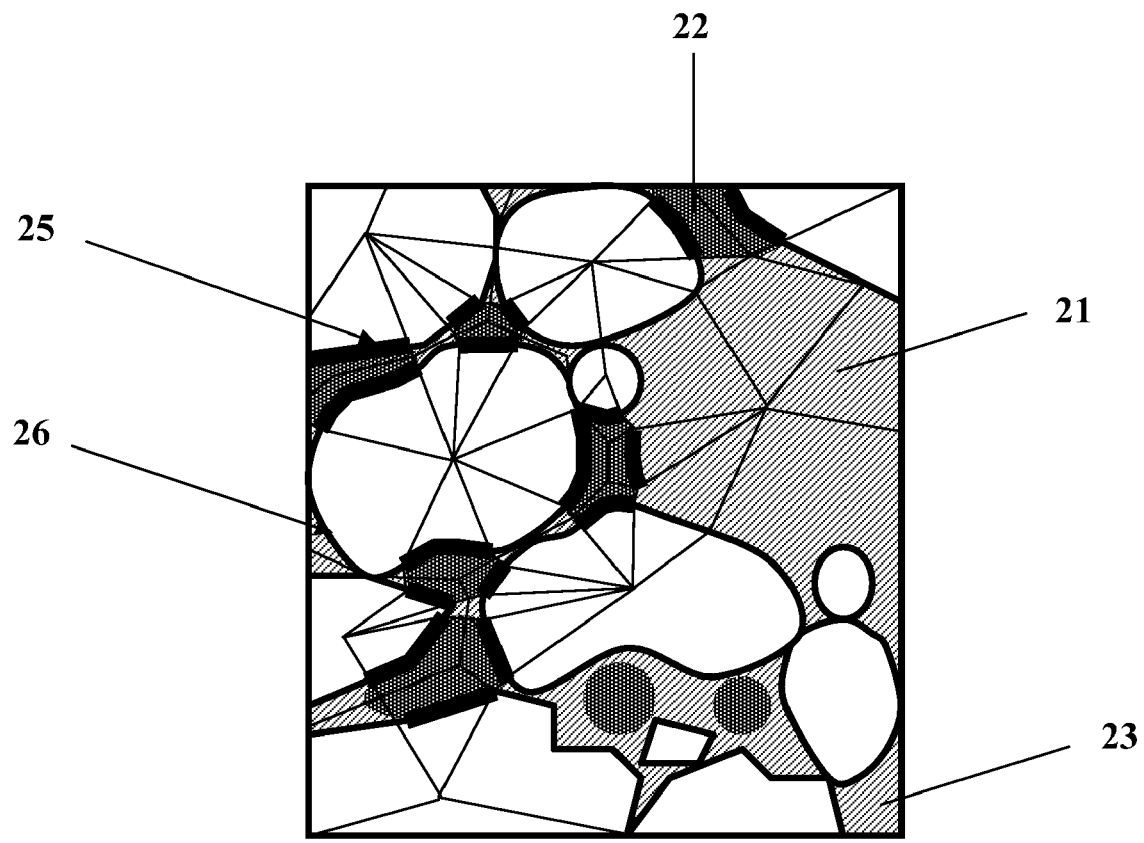
FIG. 2 shows a representation of a rock thin section with distribution of water and brine in the pores.
Figure 3A:
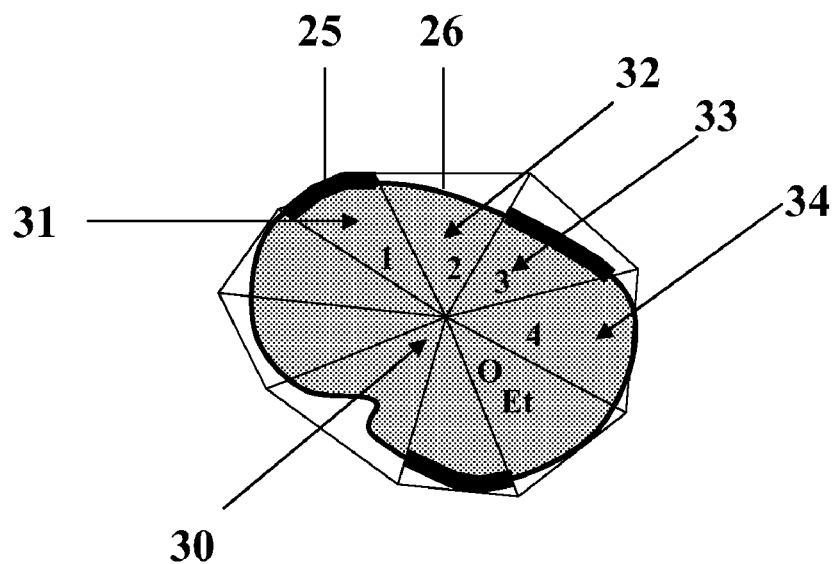
FIGS. 3A and 3B shows a division of the three dimensional space occupied by porous rock into cells constrained by the distribution of oil-wet and water-wet surfaces.
Figure 3B:
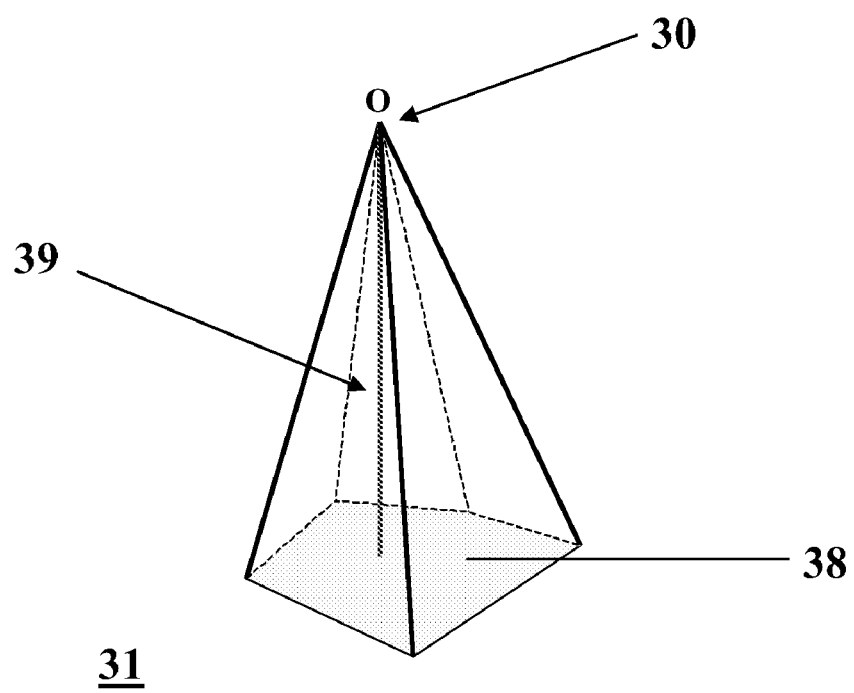

There is a strong correlation between x and $J_o$ and although the definitions are not the same, it has be shown that x is approximately equal to $J_o$ (and therefore 1−x is approximately equal to $J_w$). This correlation comes from the fact that the space occupied by the volume of porous rock can be divided up in polyhedral cells constrained by the distribution of oil-wet and water-wet pore surfaces as shown in FIG. 2. Referring to FIG. 2, the pore formation contains grain 21, oil 22 and brine 23 (or water). At the interface between oil or brine and grain, the pore surface is covered by oil 25 or by water 26. Each grain is contained in a polyhedral cell which is itself divided in several pyramidal cells (31, 32, 33, 34 and others not shown) all having a common summit point O 30 located close to the center of gravity of the grain as shown in FIG. 3A. FIG. 3B is a three dimensional view of the pyramidal cell 31 of FIG. 3A. The volume of a pyramid is equal to one third of the product of its height h 39 by its base area s 38. Therefore, for the pyramidal cell 31, we have the relation: $3V_o = h_o \cdot s_o$, "o" referring to a pyramidal cell where pore surface 25 is covered by oil. And, for the pyramidal cell 33, we have the relation: $3V_w = h_w \cdot s_w$, "w" referring to a pyramidal cell where pore surface 26 is covered by water. From there it can be shown that if the average height $h_w$ of pyramid which base correspond to water-wet surfaces is approximately equal to the average height $h_o$ of oil-wet pyramids, then $J_o$ is approximately equal to the oil-wet volume fraction of the rock x: $J_o \approx x$.

Because of the difference in time scales (geologic versus laboratory), wettability tests results obtained on cores in the laboratory might be quite different compared to wettability ($J_o$) of virgin rock in downhole conditions. Wettability tests in the laboratory are in fact "dynamic" measurements because these tests take place over short times (typically several days only). Drainage and imbibition laboratory tests also suffer very important hysteresis effects which are totally irrelevant when considering $J_o$ of a virgin formation. Counter-current imbibition is defined as water entering the porous rock from one side and oil flowing out of the porous rock from the same side, i.e. the direction of oil flow is opposite to the direction of water flow. One way this can happen is if there is capillary continuity of the water film wetting the pore network. Water-wet zones which are disconnected from the rest of the water-wet pores network will correspond in this scenario to trapped water.

If we use the percolation theory now, there is a direct link between $J_o$ and capillary continuity. Above a certain critical value of $J_o$ there cannot be any capillary continuity of water-wet zones and the imbibition of the water in the porous formation will be greatly reduced or impossible. This illustrates the link between $J_o$ and imbibition/drainage tests results, through capillary effects. These effects govern oil recovery in hydrocarbon reservoirs and this explains the importance of the measurement of the structural oil-wetting index in order to evaluate the expected oil recovery of a given formation.

A consequence of percolation theory in fractal porous media is the following percolation equation:

$$R_t = \frac{R_w}{(S_w\phi - W_c)^\mu} \quad \text{(Equation 3)}$$

This equation 3 links formation resistivity $R_t$ to the water resistivity $R_w$, the porosity $\phi$, and the water saturations $S_w$. Furthermore, this model has two petrophysical parameters: the critical conductivity exponent $\mu$ and the critical water fraction $W_c$. This equation 3 is better suited to characterize mixed-wet or oil-wet porous formations that Archie's law (Equation 1), because these two parameters are independent of the variables in the equation 3 (as opposed to Archie's law for which the n exponent is known to vary with $S_w$ in oil-wet rock).

In this mode $W_c$ must be taken equal to 0 for perfectly water-wet rick, and $W_c$ takes positive values for mixed-wet and oil-wet rocks. The maximum value $W_c$ for a given pores network geometry is taken when the pores are entirely oil-wet and is denoted $W_{c0}$. $W_{c0}$ is called the oil-wet critical water fraction and is only a function of the pore network geometry and of he contact angles water/rock, oil/rock and/or water/oil. This means that in petrophysical applications $W_{c0}$ is a characteristic of the rock type. $W_{c0}$ is expected to be substantially stable or constant for a wide range of rock types and in the range of 0.10 to 0.15. This parameter, however, is probably almost never observed in real rocks because porous formations containing oil are unlikely to be perfectly oil-wet. $W_{c0}$ is difficult to evaluate accurately even by a direct measurement on cores because it is almost impossible to make real cores containing micro-porosity entirely oil-wet. $W_c$ is expected to be less than 0.10 for typical mixed-wet formations, and more likely in the range of 0.00 to 0.05 for most porous rocks.

Finally, a link between the critical water fraction $W_c$ and the structural oil-wetting index $J_o$ will be of great interest. Considering a mixed-wet porous rock with a volume fraction x of oil-wet zones and 1−x of water-wet zones. From equation 3 the conductivity of water-wet zones is $\sigma_w = (S_w{}^w \phi_w)^\mu / R_w$ where $S_w{}^w$ and $\phi_w$ are the average water saturation and porosity of water-wet zones. And from equation 3 also, the conductivity of oil-wet zones is $\sigma_o = (S_o{}^w \phi_o - W_{c0})^{82} / R_w$ where $S_w{}^o$ and $\phi_o$ are the average water saturation and porosity of oil-wet zones. According to equation 3 the conductivity of this mixed-wet porous rock is equal to $\sigma = 1/R_t$ or, $\sigma = (S_w\phi - W_c)^{\mu/R}{}_w$.

The conductivity mixing law $\sigma^{1/2} = (1-x)\sigma_w{}^{1/2} + x\sigma_o{}^{1/2}$ known as the CRIM law (Complex Refractive Index Mixing law) allows to express the average conductivity of a medium mixture made of a random distribution of two conductivities with associated volume fractions. This law is known to provide food match with experimental data. It can be shown that replacing the exponent ½ by a number close to the same value, such as $1/\mu$—i.e. the inverse of the critical conductivity exponent in equation 3—does not change in a significant manner the mixing law. Therefore by using the modified CRIM law, the relation linking the conductivity of this mixed-wet porous rock becomes:

$$\sigma^{1/\mu} = (1-x)\sigma_w{}^{1/\mu} + x\sigma_o{}^{1/\mu} \quad \text{(Equation 4)}$$

We also have the following relationships:

$$\phi = (1-x)\phi_0 + x\phi_1 \quad \text{(Equation 5)}$$

and $$S_w\phi = (1-x)S_{w0}\phi_0 + xS_{w1}\phi_1 \quad \text{(Equation 6)}$$

Using the expressions of conductivities introduced above and replacing them in equation 4 leads directly to $S_w\phi - W_c \approx (1-x)S_w{}^w\phi_w + x(S_w{}^o\phi_o - W_{c0})$ with equation 6 provides the relation:

$$W_c \approx xW_{c0} \quad \text{(Equation 7)}$$

As already said above $J_o \approx x$, and the equation 7 becomes:

$$J_o \approx W_c/W_{c0} \quad \text{(Equation 8)}$$

A new definition of the oil-wetting index is made resulting from the equation 8. The structural oil-wetting index is defined as:

$$J_O = W_c/W_{c0} \quad \text{(Equation 9)}$$

By definition $J_O$ is equal to 0 for perfectly water-wet formations and to 1 for perfectly oil-wet formations, as we have seen above $J_O$ is expected to be very close or equal to the oil-wet volume fraction of the rock, which is also, as we have shown, approximately equal to the oil-wet pores surface fraction.

Figure 4:
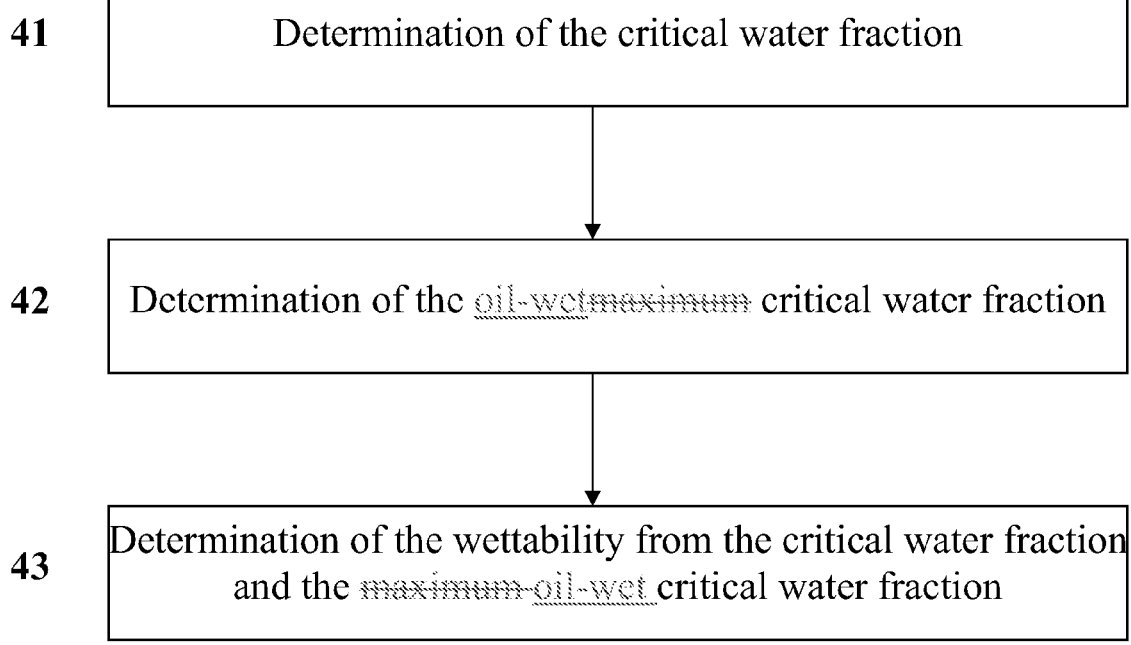
FIG. 4 is a diagram of the method according to the invention.

The method for determination of the wettability $J_O$, or equivalently the structural oil-wetting index, or equivalently the volume fraction of oil-wet rock, or equivalently the average oil-wet fraction of pores surface, according to the invention is described in FIG. 4. In a first step 41, the critical water fraction ($W_c$) is determined, in a second step 42 the oil-wet critical water fraction ($W_{c0}$) is determined. It is noted that the step 42 can also be done before the step 41. In the last step 43, the critical water fraction ($W_c$) is combined with oil-wet critical water fraction ($W_{c0}$) to obtain wettability $J_O$. The last step 43 preferably corresponds to equation 9.

Combing equation 9 and the percolation equation (Equation 3), the structural oil-wetting index is equal to:

$$J_O = \frac{1}{W_{c0}}\left(S_w\phi - \left(\frac{R_w}{R_t}\right)^{1/\mu}\right) \quad \text{(Equation 10)}$$

$$W_c = S_w\phi - \left(\frac{R_w}{R_t}\right)^{1/\mu} \quad \text{(Equation 11)}$$

where $S_w$ is the water saturation of the porous formation, $\phi$ is the porosity of the formation $R_w$ is the resistivity of the water (or brine) contained in the porous formation. $R_t$ is the resistivity of the porous formation, $\mu$ is the critical conductivity exponent (substantially equal to 2). $W_c$ is the critical water fraction, and $W_{c0}$ is the oil-wet critical water fraction of the porous formation if it was made perfectly oil-wet (a parameter which is characteristic of the rock type).

In the patent application EP04293036.2 filed Dec. 17, 2004 it has been proposed a method to measure the critical conductivity exponent $\mu$ and the critical water fraction $W_c$. The value $\mu$ is estimated or predetermined and $W_c$ can be calculated using equation 11. This method can also be used according to the critical water fraction $W_c$. The wettability $J_O$ is after deduced using equation 9.

The value assumed for $\mu$ can be derived from the correlation that exists between the critical exponent and the rock lithofacies, i.e. the type of rock. The rock type is defined by its type of rock lithofacies or its lithologic type. Indeed $\mu$ is known to be directly a function of the geometrical structure of the pores network of the rock. Such correlation can be established one and for all and stored in a "catalog" of rock types. Rock types can be recognized from suitable log measurements (e.g. litholog, lithotool kit applications as performed by applicant's tools) and the corresponding value of $\mu$ inferred. For some applications the critical exponent can also be taken substantially equal to 2.

Another method to measure the critical conductivity exponent $\mu$ and the critical water fraction $W_c$ according to equation 11 can be used. In equation 11, the resistivity of the porous formation $R_t$ and the water saturation of the porous formation $S_w$ are measured at two different times, but for the same volume of rock, meaning at the same location for same rock. Furthermore, the porosity of the formation $\phi$ and the resistivity of the water (or brine) contained in the porous formation are known values; estimated before, measured before or measured independently at the same time. Those values $\phi$ and $R_w$ remain constant during the measurements of $R_t$ and $S_w$. Two sets of measurements of $R_t$ and $S_w$ are realized for two different values of the water saturation of the porous formation at the same location, so that two independents equations are obtained:

$$W_c = S_{w1}\phi - \left(\frac{R_w}{R_{t1}}\right)^{1/\mu}, \quad W_c = S_{w2}\phi - \left(\frac{R_w}{R_{t2}}\right)^{1/\mu} \quad \text{(Equations 12 and 13)}$$

This can be realized for example by making the first set of measurements with a logging while drilling tool when first drilling through the volume of formation and making the second set of measurements several hours later while tripping out of the hole and when the tool comes back in front of the same volume of formation. The time difference has allowed the mud filtrate to invade the formation and to change the water saturation to a different value. Another way to realize these two measurements is to make the first measurement as described above and to make the second measurement with a wireline logging tool at a later time.

The critical conductivity exponent $\mu$ and the critical water fraction $W_c$ are deduced from equations 12 and 13, and the wettability $J_O$ is after deduced using equation 9.

Equation 10 is applicable to the simple case where there are no conductive fractures in the formation that significantly impact the value of the resistivity, and if the exponent m of Archie's law (Equation 1) is sufficiently close to $\mu$, i.e. in practical terms close to 2 or less than 2. When one or both of these conditions are not met, a more complex model must be used to account for the effect of fracture sand the effect of electrically non-connected porosity. The structural oil-wetting index is then equal for the complete model to:

$$J_O = \frac{1}{W_{c0}}\left(S_w(\phi - \phi_{enc}) - \left(\frac{R_w}{R_t} - \frac{R_w}{R_f}\right)^{1/\mu}\right) \quad \text{(Equation 14)}$$

$$W_c = S_w(\phi - \phi_{enc}) - \left(\frac{R_w}{R_t} - \frac{R_w}{R_f}\right)^{1/\mu} \quad \text{(Equation 15)}$$

where in addition to parameters defined in equation 10, $R_f$ is the resistivity of conductive fractures present in the volume of formation covered by the resistivity measurement, and the electrically non-connected porosity $\phi_{enc}$ is defined as $\phi_{enc} = \phi - \phi^{m/\mu}$ where m is the cementation exponent of Archie's law (Equation 1).

Formations which contain conductive fractures can be detected using commercial tools available in the logging industry such as borehole imaging tools resistivity or ultrasonic based), or such as sonic tools. The value of $R_f$ is generally evaluated from high resolution resistivity tools. Formations with high values of the concentration exponent m are generally well known. These are typically carbonate formations with significant amount of non-connected vuggy porosity. Values of m larger than 3 have been observed in some parts of the world (e.g., in Qatar) for which the correction must be applied in order to obtain meaningful values of the structural oil-wetting index. After the both values $Rf$ and $\phi_{enc}$ or m are estimated or measured the same method as see above according the equation 11 is used. The critical conductivity exponent $\mu$ and the critical water fraction $W_c$ are deduced from equation 15, and the wettability $J_O$ is after deduced using equation 9.

In step 42 of FIG. 4, the oil-wet critical water fraction ($W_{c0}$) is determined. The value for the oil-wet critical water fraction can be derived from the correlation that exists with the rock type. Effectively, the oil-wet critical water fraction ($W_{c0}$) is known to be directly a function of the rock type or the geometrical structure of the pores network of the rock. The rock type is defined by its type of rock lithofacies or type of organic character. The value of the oil-wet critical water fraction can be estimated or predetermined. The correlation can be established once and for all and stored in a "catalog" of rock types giving a relation table linking each type of organic character of the rock to a value of the oil-wet critical water fraction.

In another aspect of the invention, the oil-wet critical water fraction can also be taken substantially equal to 0.15. In this case the structural oil-wetting index will be said "normalized". Such "Normalized Structural Oil-wetting Index" is a simpler and therefore robust and useful indicator of the wettability of formations.

It is possible that for some rock types the value of $W_{c0}$ depends on the porosity of the rock, and for example, if it is observed for those rock types that the characteristic parameter is actually the ratio $W_{c0}/\phi$ which is called the oil-wet critical water saturation $S_{c0}$. The method according to another aspect of the invention is to include in the relation table, the parameter $S_{c0}$ and to compute $W_{c0}$ using a porosity measurement: $W_{c0} = S_{c0}\phi$.

In another aspect of the invention, the dependency on wettability of the Archie's n exponent is given. The fact that n provides an indication of wettability has been known for a long time but until now no quantitative relationship had been proposed to formalize this link. Equating Archie's law (Equation 1) to the percolation equation (Equation 3) and using the definition of the structural oil-wetting index we obtain the following formula which explains the dependency of n with other formation parameters, including wettability:

$$n = \mu \frac{\ln(S_w - J_0 W_{C0}\phi)}{\ln S_w} \quad \text{(Equation 16)}$$

Equation 16 is applicable when $m = \mu$ and therefore one can use Archie's m exponent instead of $\mu$ in this equation. This equation can also be written as:

$$J_O = \frac{\phi}{W_{C0}}(S_w - S_w^{n/m}) \quad \text{(Equation 17)}$$

Figure 5:
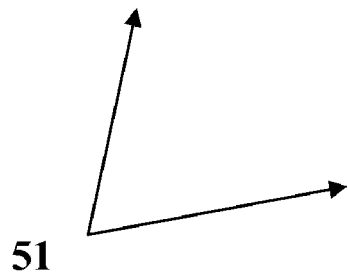
FIG. 5 is representation of a wettability map of a reservoir derived from measurement of the structural oil-wetting index according to the invention.

A more complete model in case of presence of conductive fractures, and/or in case of significant vuggy porosity with high m values (m larger than 2) is:

$$n = \frac{\ln(R_w/R_f/\phi^m + (S_w - J_o W_{C0}/(\phi - \phi_{enc}))^\mu)}{\ln S_w}$$ (Equation 18)

whereas, $\phi_{enc} = \phi - \phi^{m/u}$,

FIG. 5 is a representation of a wettability map of a reservoir derived from measurement of wettability according to the invention. The map is derived from well-to-well correlations using the structural oil-wetting index $J_O$ logs 51. The map can then be compared with the lithology model, the location of fluid contacts (Oil/Water contact) as well as fluid monitoring maps such as the one obtained using cross-well Electro-Magnetic Imaging technology.

Such wettability maps provide critical information to predict and model the fluid movements in the reservoir, for example water injected in injector wells and its progression the in 3 directions of space. Water being injected in a sufficiently oil-wet zone will have a tendency to move horizontally and not drop due to gravity because of the effect of capillary pressure.

The wettability maps are therefore a key tool for optimum placement of injectors and producers in a field. A technique providing wettability logs in oil and gas wells would immediately allow the creation of a wettability 3D field map which will have a significant impact on the field development. The position and shape of injector wells would be directly a function of the wettability map and the design of the entire reservoir sweepage plan would greatly benefit from this type of information.

The advantages of the wettability determination are the direct or in-situ determination from measurements with one or several downhole tools and the continue determination because measurements are taken continuously and rapidly versus depth.

A very important step in the modeling of the dynamic behavior of oil and gas reservoirs is the determination of the effective permeabilities of the formations throughout the reservoir with multi-phasic flow. This determination is generally made by calculating the permeability K as a function of the porosity of the formation using a "K–$\phi$ law", and then applying a multiplier called the relative permeability (e.g. relative to water or oil). The relative permeabilities are generally characterized by curves measured on cores in the laboratory as a function of the water saturation of the core.

In carbonates the prediction of accurate permeabilities has proven very difficult and one observes wide discrepancies between actual permeability, and relative permeabilities, of cores and calculated permeabilities. Reasons for such wide discrepancies are the effect of the geometry of the porous medium which is linked to the rock type and the influence of the oil-wetting index of the formation on the relative permeabilities of water and oil in porous rock. For the same water saturation, a core can exhibit very different values of the relative permeabilities depending on the structural oil-wetting index $J_o$ of the formation. A transform which would only take into account the porosity and the rock type (i.e. the geometry of the pores network system, and pores size distribution) and $S_w$ will have a wider spread of points compared to a transform that would include the structural oil-wetting index $J_o$ as a parameter.

Figure 6:
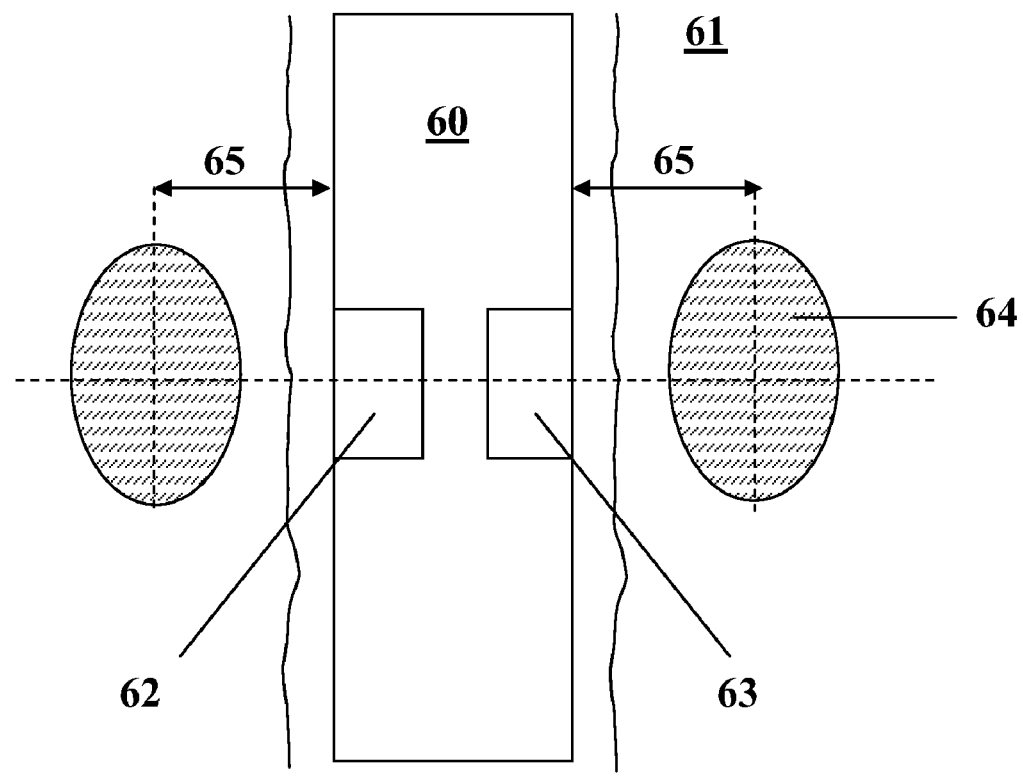
FIG. 6 is a downhole tool used in a well to perform the method for measuring the structural oil-wetting index according to the invention

FIG. 6 is a schematic of a downhole tool 60 used in a wellbore 61 to perform the method for measuring wettability as described above. The downhole tool can be a logging tool or a logging while frilling tool. Preferably, the tool is a logging while drilling tool which allows an optimum measurement of $W_c$ in order to determine the structural oil-wetting index $J_O$.

The downhole tool makes two independent measurements of $R_t$ and $S_w$ at two different times, but for the same volume of rock, meaning at the same location in well depth for the same radial distance of the rock volume from the axis of the well 64; first set of measurements $R_{t1}$ and $S_{w1}$ are realized while drilling, and second set of measurements $R_{t2}$ and $S_{w2}$ are realized while tripping (several hours later). Due to the time difference, the second set of mesurements are made in a volume of rock in which mud filtrate invasion had time to be much more significant than for the first set of measurements. In other words $S_{w2}$ is greater than $S_{w1}$ assuming that the well is drilled with water-based mud. From these two sets of measurements and using known values of the porosity of the formation $\phi$ and the resistivity of the water $R_w$, one can resolve equations 12 and 13 to determine $W_c$ and $\mu$.

For such a method to work properly, it is important that not only the $R_t$ and $S_w$ measurements are made at the same depth of investigation 65 (radial distance from the well or the tool longitudial axis), but also that there are co-located at the same place in the tool (well depth). If it is not the case, like for example if the $S_w$ measurement is made with a sensor which is located several meters) above or below the $R_t$ measurement sensor in the tool string, several meters correspond to a typical drilling time of a fraction of one hour and invasion might have progressed sufficiently in that time to make the method inaccurate.

The downhole tool 60 is therefore designed such that a sigma neutron measurement of $S_w$, or a dielectric measurement of $S_w$, 62 is co-located with a shallow laterolog resistivity measurement $R_t$ 63 which matches the depth of investigation 65 of the sigma neutron measurement. This downhole tool will allow to acquire in the same volume 64 of rock and at the same time (therefore with the same invasion) the water saturation and the resistivity of the transition zone $S_{xo}$ and $R_{xo}$. The volume 64 defines a torus with symmetry axis identical to tool axis.

The first sensor can be sigma neutron capture cross-section sensor and/or a carbon-oxygen neutron sensor. The second sensor is a dielectric constant sensor and/or a resistivity sensor.

The invention claimed is:

1. A method for determining the wettability ($J_o$) of an underground formation traversed by a borehole, the method comprising:
   determining the critical water fraction of said underground formation ($W_c$);
   determining the critical water fraction of said underground formation taken entirely oil-wet, which is called the oil-wet critical water fraction ($W_{co}$); and
   combining said critical water fraction ($W_c$) and said oil-wet critical water fraction ($W_{co}$) in order to determine the wettability ($J_o$) of said underground formation.

2. The method of claim 1, wherein the step of determining the critical water fraction comprises:
   (a) determining a set of properties of said underground formation, said properties being chosen among a list comprising: formation resistivity ($R_t$), water resistivity ($R_w$), formation water saturation ($S_w$), and formation porosity ($\phi$);
   (b) determining the critical exponent of the electrical conductivity of said formation ($\mu$); and
   (c) calculating from said set of properties and said critical exponent ($\mu$) the critical water fraction.

3. The method of claim 2, wherein the set of properties of said underground formation are measured using at least one downhole tools lowered in the borehole.

4. The method of claim 2, wherein the formation porosity ($\phi$), the formation resistivity ($R_t$) and the formation water saturation ($S_w$) are measured using at least one downhole tool lowered in the borehole and wherein the water resistivity ($R_w$) is an estimated value.

5. The method of claim 2, wherein said critical exponent is taken constant and substantially equal to 2.

6. The method of claim 2, wherein the step of determining the critical exponent ($\mu$) comprises:
(d) determining the rock type of said underground formation from lithologic measurements; and
(e) deducing from said rock type the value of said critical exponent ($\mu$).

7. The method of claim 6, further comprising the use of a first predetermined relation table linking each rock type of said underground formation to a value of said critical exponent ($\mu$).

8. The method of claim 1, wherein said oil-wet critical water fraction is taken constant and substantially equal to 0.15.

9. The method of claim 1, wherein the step of determining the oil-wet critical water fraction comprises:
(f) determining the rock type of said underground formation from lithologic measurements; and
(g) deducing from said rock type the value of said oil-wet critical water fraction.

10. The method of claim 9, further comprising the use of a second predetermined relation table linking each rock type of said underground formation to a value of said oil-wet critical water fraction.

11. The method of claim 1, wherein the wettability ($J_o$) of said underground formation is the critical water fraction ($W_c$) divided by the oil-wet critical water fraction ($W_{c0}$).

12. A method for determining a map of the wettability ($J_o$) of a geological formation traversed by a borehole, the method comprising:
(j) Determining directly and continuously the wettability value ($J_o(z)$) for different depth (z) of the borehole according to the method as claimed in any one of preceding claims; and
(k) combining said wettability values to determine a map of the wettability ($J_o$) of the geological formation.

13. An apparatus for performing downhole measurement of the wettability ($J_o$) of an underground formation traversed by a borehole, said apparatus having a longitudinal axis and being lowered in the borehole along said longitudinal axis, said apparatus comprising:
(n) a first sensor for measuring the water saturation ($S_w$) of said underground formation;
(o) a second sensor for measuring the resistivity ($R_t$) of said underground formation;
and said apparatus being characterized by the fact that, first and second sensors are location substantially at the same position along the longitudinal axis of said apparatus, and first and second sensors measure a same location of said underground formation: and said apparatus:
determines the critical water fraction ($W_c$) of said underground formation from the water saturation ($S_w$) and the resistivity ($R_t$);
determines the oil-wet critical water fraction ($W_{c0}$) of said underground formation; and
deduces the wettability ($J_o$) of said underground formation from the critical water fraction ($W_c$) and the oil-wet critical water fraction ($W_{c0}$).

14. The method for determining the wettability ($J_o$) of an underground formation traversed by a borehole, the method comprising:
determining the ratio "n/m" of Archie's law exponents (n/m), the porosity ($\phi$) and the water saturation ($S_w$) of said underground formation;
determining the critical water fraction of said underground formation taken entirely oil-wet, which is called the oil-wet critical water fraction ($W_{c0}$); and
combining said ratio (n/m), said oil-wet critical water fraction ($W_{c0}$), said porosity ($\phi$) and said water saturation ($S_w$) in order to determine the wettability ($J_o$) of said underground formation.

15. The method of claim 14, wherein the ratio (n/m), the porosity ($\phi$) and the water saturation ($S_w$) of said underground formation are measured using at least one downhole tools lowered in the borehole.

16. The method of claim 14, wherein said oil-wet critical water fraction is taken constant and substantially equal to 0.15.

17. The method of claim 14, wherein the step of determining the oil-wet critical water fraction comprises:
(h) determining the rock type of said underground formation from lithologic measurements; and
(i) deducing from said rock type the value of said oil-wet critical water fraction.

18. The method of claim 17, further comprising the use of a second predetermined relation table linking each rock type of said underground formation to a value of said oil-wet critical water fraction.

19. The method of claim 12, wherein the wettability ($J_o$) of said underground formation is given by the relation:

$$J_o = \frac{\phi}{W_{C0}}(S_w - S_w^{n/m}).$$

20. A method for determining a map of the wettability ($J_o$) of a geological formation traversed by at least two boreholes, the method comprising:
(l) determining directly and continuously the wettability value ($J_o(z)$) for different depth (z) for each borehole according to the method as claimed in any one of claims 1 to 19; and
(m) combining said wettability values to determine a map of the wettability ($J_o$) of the geological formation.

21. The apparatus of claim 13, wherein the same location is located at a radial distance from the longitudinal axis of said apparatus and is defined by an angular sector from the longitudinal axis of said apparatus.

22. The apparatus of claim 21, wherein the same location is defined by a torus surrounding the borehole and having a symmetry axis identical to the longitudinal axis of said apparatus when the apparatus is spinning around said longitudinal axis.

23. The apparatus of claim 13, wherein the first sensor is a sigma neutron capture cross-section sensor.

24. The apparatus of claim 13, wherein the first sensor is a carbon-oxygen neutron sensor.

25. The apparatus of claim 13, wherein the second sensor is a dielectric constant sensor.

26. The apparatus of claim 13, wherein the second sensor is a resistivity sensor.

* * * * *